United States Patent Office 2,949,178
Patented Aug. 16, 1960

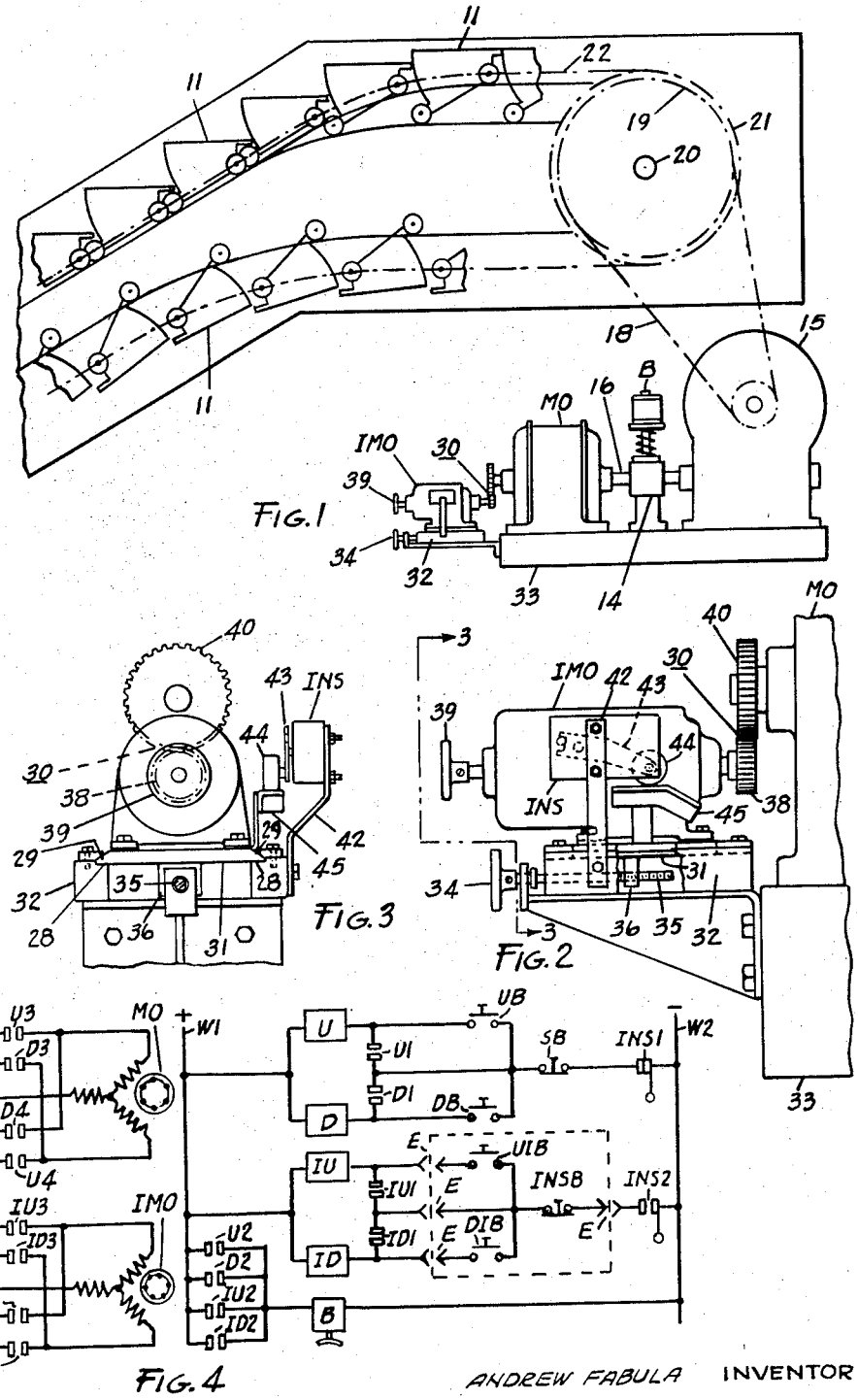

2,949,178

SLOW SPEED INSPECTION DEVICE FOR MOVING STAIRWAY

Andrew Fabula, Hohokus, N.J., assignor to Otis Elevator Company, New York, N.Y., a corporation of New Jersey Filed Oct. 24, 1958, Ser. No. 769,467

6 Claims. (Cl. 198—16)

This invention relates to moving stairways and more particularly to a device for driving a moving stairway at slow speed for inspection purposes.

Moving stairways are inspected at regular intervals. A stairway operates too fast at normal operating speed for thorough inspection, and its controls for starting and stopping are not conveniently placed for carrying out an inspection.

It is therefore an object of the invention to drive a moving stairway at slow speed for inspection purposes.

Another object of the invention is to control the slow speed operation from a location convenient for inspection purposes.

Another object of the invention is to provide an auxiliary driving means for driving a moving stairway at about one tenth its normal operating speed.

Another object of the invention is to provide portable controls for the slow speed operation of a moving stairway.

How the above described objects are atttained as well as a more complete understanding of the invention may be secured more readily by reference to the following description of a preferred embodiment taken in conjunction with the accompanying drawing in which:

Figure 1 is a diagramatic side view of a part of a moving stairway in which the invention is incorporated;

Figure 2 is an enlarged side view of the invention inporated with a part of the stairway driving mechanism in operating position;

Figure 3 is an end view of Figure 2 taken along line 3—3; and

Figure 4 is a simplified schematic diagram of the power and control circuits of a moving stairway in which the invention is incorporated in standby position.

Referring to Figure 1, the portion of a moving stairway illustrated comprises the upper part of an endless series of steps 11 driven by a first driving mechanism. The first driving mechanism comprises in combination a first drive motor MO with a brake on motor drive shaft 16, reduction gearing 15 driven by the drive shaft, a driving chain 18 driven by the reduction gearing, a sprocket wheel 19 driven by the driving chain, a main shaft 20 driven by the sprocket wheel, a sprocket wheel 21 on each side of the stairway driven by the main shaft, and a running gear chain 22 to which the endless series of steps are attached driven by each sprocket wheel 21. The brake 14 is applied by spring pressure and released by the action of brake coil B when it is energized.

Referring to Figures 1, 2 and 3, the invention is disclosed in an arrangement employing a second drive motor IMO mounted to cooperate with the stairway drive mechanism through the gear reduction 30 and a mechanical interlock switching means which acts to prevent the simultaneous operation of the first drive motor MO and the second drive motor IMO and the operation of either motor at the instant the driving gears are engaging or disengaging. The second drive motor IMO may suitably be of the squirrel cage induction type of one third horsepower rating at 192 r.p.m. The ends of its armature shaft are extended to mount the handwheel 39 on the free end and on the pulley end gear 38 of the gear reduction 30, the other gear 40 of which is mounted on the free end of the drive shaft 16 of motor MO. Said second drive motor IMO is bolted to a base plate 31 which has longitudinal slide flanges on each side.

The mounting for the second drive motor IMO comprises a horizontal base 32 bolted to the first drive motor end of the bed plate 33. This base has parallel supporting surfaces 28 and retaining surfaces 29 extending back from the bed plate 33 for engaging and supporting the longitudinal slide flanges of the base plate 31. The base plate is left free to slide in the mounting but cannot fall off. Thus the second drive motor IMO is slidably mounted so that its drive shaft is parallel to the drive shaft 16, and gear 38 on said second drive motor drive shaft meshes with gear 40 on drive shaft 16 at the limit of travel of second drive motor IMO in its mount, the gears being out of mesh at the opposite limit of travel. A threaded shaft 35, having a handwheel 34 at the free end, is rotatably mounted in a restraining mount in the base 32 parallel to and below the sliding surfaces and engages a vertical member 36 which is tapped and attached to base plate 31. Manual rotation of restrained threaded shaft 35 by means of handwheel 34 causes the vertical member 36 to move horizontally along the threaded length of shaft 35 thus moving the base plate and attached second drive motor on its slide mounting.

The mechanical interlock switching means comprises a single pole double throw switch INS having an operating arm 43 terminating in a roller 44, and an actuating cam 45 that cooperated with the roller arm to operate the switch. The switch is mounted on bracket 42 attached to base 32. The actuating cam is attached to the base plate 31 and moves with it, engaging the roller 44 on its cam surface. The switch may be of any suitable construction having two pairs of contacts INS1 and INS2 which are actuated to their open and closed positions by the movement of switch arm 43 as it is activated by roller 44 in following the face of moving cam 45. As shown in Figure 2, arm 43 is moved to one of its limit positions by cam 45 having been advanced toward the motor MO to its greatest extent and roller 45 having been moved up the cam face to its limiting position. In this position contacts INS1 are opened and contacts INS2 are closed. It will be understood that contacts INS1 and INS2 will both assume their open position when roller 44 is midway down the face of cam 45 and will remain in this position until arm 43 is moved a suitable amount in either direction, for example five or ten degrees about its pivot from its position corresponding to the mid-cam position of roller 44. When cam 45 has been backed away from motor MO to the greatest extent and roller 45 has moved down the cam face to its other limit position, contacts INS1 are closed and contacts INS2 are opened as illustrated in Figure 4.

Referring to Figure 4, the wiring diagram schematically shows the power and control circuits for the first drive motor MO and the second drive motor IMO in "across-the-line" form; the relay and switch contacts being shown in open and closed positions corresponding to the deenergized condition of their respective coils. Coils are designated by the letters U for up, D for down, and I for inspection depending on which way they cause which motor to drive the stairway. Contacts are designated by their associated coil letters plus a suffix number, and they are consecutively numbered.

The power circuits comprise the first drive motor MO and the second drive motor IMO connected in parallel across a three phase alternating current supply, L1, L2 and L3 (source not shown), with contacts for starting, stopping and reversing each motor in power leads L1 and L3 for each motor. Contacts designated U3 and U4 are in the power leads L1 and L3 respectively to the first drive motor MO and the contacts designated D3 and D4 are connected to reverse the L1 and L3 connections to that motor. Similarly contacts IU3 and IU4 are in the power leads L1 and L3 to said second drive motor IMO and contacts ID3 and ID4 are connected to reverse L1 and L3 connection to said second drive motor IMO. Each of the contacts is respectively actuated by its coil U or D in the first drive motor MO first control circuit and IU or ID in said second drive motor IMO second control circuit.

The control circuits for drive motor MO and inspection motor IMO are connected in parallel across a direct current supply W1-W2 which may be derived from rectifiers and the three phase A.C. supply. Brake coil B is also connected across the D.C. supply in series with parallelly connected contacts U2, D2, IU2 and ID2. Both control circuits are electrically similar, each comprising equivalent electric elements, and for that reason only the second control circuit for said second motor IMO will be described in detail; it being understood that corresponding elements of the first control circuit for said first drive motor MO act in substantially the same way.

A pair of cam-operated interlock switch contacts INS2 connect normally closed stop switch INSB to the negative side of the D.C. supply. Up switch UIB and down switch DIB are connected in parallel with each other and in series with switch INSB. These up and down switches are subject to being bypassed by holding contacts UI1 and ID1, respectively. Coil IU is connected in series with switch UIB and coil ID is connected in series with switch DIB. Coils IU and ID are connected in parallel with each other and have a common connection to positive D.C. power supply lead W1.

Similarly the control circuit of motor MO comprises interlock switch contacts INS1, stop switch UB, down switch DB, holding contacts U1 and D1, coils U and D which are connected together in a circuit similar to that previously described and act in substantially the same way with respect to said first drive motor MO. However, stop switch INSB, up switch UIB and down switch DIB, while in the same circuit configuration as said first control circuit counterparts, are mounted in a suitable portable receptacle and are connected to their respective circuit elements by means of any convenient plug-in connection. This feature is indicated in Figure 4 by enclosing the elements within broken lines and showing connections with the remainder of the control circuit by arrow symbols E.

Assume now it is desired to operate the stairway at reduced speed in the up direction for purposes of inspection. Under these circumstances, driving power is applied to the stairway by the second drive motor IMO and the first control circuit of the first driving motor MO is made inoperative.

The portable receptacle, in which stop switch INSB, up switch UIB and down switch DIB are mounted, is plugged into the inspection motor IMO control circuit outlet at a convenient inspection point E. Second drive motor IMO is moved forward into place such that its gear 38 is meshed with gear 40 on the free end of drive shaft 16 by rotation of handwheel 34 to move said motor forward on base 32 and by oscillation of handwheel 39 to mesh the gears. The forward movement of said second drive motor IMO moves attached cam 45 forward forcing roller 44 at the end of switch arm 43 to follow the face of the cam. As switch arm 43 is carried up by the roller, the mechanical interlock switch INS is actuated first to open its contacts INS1 in the first control circuit of first drive motor MO thereby making it inoperative and preventing up coil U and down coil D from being energized by their respective switches UB or DB. Open interlock switch contacts INS2 which are in the second control circuit of said second drive motor IMO are not actuated to close until roller 44 almost reaches the top end of the inclined portion of the face of cam 45. When this point is reached, gears 38 and 40 are meshed, switch arm 43 reaches its upper limit position and interlock switch contacts INS2 close to make the second control circuit for second drive motor IMO operative.

Up switch UIB is now closed manually thus energizing up coil IU which closes its associated contacts IU1, IU2, IU3 and IU4. Holding contacts IU1 bypass up switch UIB thus permitting the release and opening of UIB without deenergizing Up coil IU. The closing of contacts IU2 in the circuit of brake coil B energizes coil B to release brake 14 on drive shaft 16. Contacts IU3 and IU4, in the power leads L1 and L2 respectively of motor IMO, close to energize said second drive motor IMO to drive the stairway in the up direction through gear reduction 30 and the stairway first driving mechanism.

Assume now it is desired to stop the stairway. Stop switch INSB is opened breaking the second control circuit through holding contacts IU1 to Up coil IU, deenergizing it and causing its associated contacts to open. After contact IU1 opens, stop switch INSB is released and closes without energizing coil IU. With contacts IU2 open, brake coil B is deenergized and brake 14 on drive shaft 16 is applied by spring pressure. Opening of contacts IU3 and IU4 deenergizes second drive motor IMO and the stairway stops.

Assume it is now desired to operate the stairway at reduced speed in the down direction. Down switch DIB is closed manually to energize down coil ID and cause its associated contacts ID1, ID2, ID3 and ID4 to close. Holding contacts ID1 and brake release contacts ID2 respectively bypass switch DIB and energize brake coil B in a manner similar to that described for the up direction. Contacts ID3 and ID4 reverse the connections of L1 and L3 to said second drive to motor IMO to drive the stairway in the down direction. The stairway is stopped by opening stop switch INSB, the down coil and contacts reacting as described for the corresponding up coil and contacts.

Assume now it is desired to operate the stairway at normal speeds. The second drive motor IMO is moved back in its mount 32 by rotating handwheel 34 in a counterclockwise direction to separate gears 38 and 40 of gear reduction 30. The backward movement of said second drive motor IMO moves attached cam 45 with it causing roller 44, at the end of switch arm 43, to roll down the face of the cam. Switch arm 43 swings down to actuate the interlock switch INS to open its contacts INS2 in the control circuit of said second drive motor IMO thereby rendering this motor inoperative. Interlock switch contacts INS1, which are open, are not actuated to close until roller 44 reaches the lower end of the face of cam 45. When the roller reaches this point, gears 38 and 40 are completely separated, switch arm 43 reaches its lower limit position and contacts INS1 close to make operative the first control circuit of first drive motor MO. The first control circuit is similar to the control circuit of second drive motor IMO and its switches, coils and contacts operate in the same way as the corresponding switches, coils and contacts of that second control circuit.

The portable receptacle mounting the inspection switches may be unplugged from the control circuit for second drive motor IMO and carried with the inspecting party to the next stairway to be inspected.

As changes can be made in the above described construction and many apparently different embodiments of this invention can be made without departing from the scope thereof, it is intended that all matter contained in the above description or shown on the accompanying

What is claimed is:

1. In a moving stairway having a first drive motor with a rotating element and an energizing circuit which when energized causes said element to drive said stairway at a normal operating speed, a second drive motor having a second rotating element and a second energizing circuit therefor, said second motor being mounted in sliding relation upon a stationary base adjacent to said first motor, and being movable on said base to engage its rotating element with the rotating element of said first motor, a mechanical interlocking switching means operative in response to movement of said second motor on its base and having contacts connected in the energizing circuits of said first and second motors whereby the energizing circuit of the second motor is completed and that of the first motor is interrupted when the two rotating elements are in full engagement to drive said stairway at reduced speed by means of the second motor, and whereby the energizing circuit of said second motor is interrupted and the energizing circuit of said first motor is completed when the two rotating elements are completely disengaged to drive said stairway normally by means of the first motor, and whereby the energizing circuits of both the first and second motors are interrupted during the period when said rotating elements are in the process of engaging and disengaging so that neither motor can be energized at this time.

2. In a moving stairway having a first drive motor which when activated operates said moving stairway at a normal operating speed; a second drive motor means operative when activated to rotate said first drive motor to drive said moving stairway at a substantially reduced speed; said second drive motor means including a base mounted adjacent to said first drive motor; a second drive motor mounted on said base in sliding relation with it and axially parallel with said first motor; means manually operative to advance and retract said second motor on said base toward and away from said first motor; connecting means comprising a gear on the driving end of said second motor and a gear on the free end of said first motor for coupling said first and second motors and acting as a gear reduction when said second motor is moved to a limit of travel on its base, and for uncoupling when moved to the other limit of travel; and electrical contactor means having electrical contacts and an operating arm with a roller connected thereto mounted on said base, and a cam having an inclined face mounted on said second motor, said operating arm, roller and cam being mounted in a relation such that the roller traverses the face of said cam as said second motor is moved along its base, the electrical contacts being so connected with said first and second electric motors that said first motor is made inoperative and said second motor can be made operative when it is moved to its limit position to drive the stairway through the coupling of said connecting means, and that said first motor can be made operative and said second motor is made inoperative when said second motor is moved to its limit position to uncouple said connecting means.

3. In combination with a moving stairway having a first driving means to drive said stairway at a normal operating speed and control means for starting, reversing and stopping said driving means, second driving means for relatively slow speed operation of the stairway comprising a second drive motor adapted to being connected to said driving means to drive said stairway at a reduced speed, and disconnected from said driving means when stairway is driven at normal operating speed, auxiliary control means for starting, stopping and reversing said auxiliary driving means, and mechanical interlock switching means for energizing said auxiliary control means and deenergizing said control means when said connecting means are so coupled, and for deenergizing said auxiliary control means and energizing said control means when said connecting means are uncoupled, and for deenergizing both said control means when said connecting means are partially coupled.

4. In a moving stairway including an endless series of steps, a first drive motor for driving said series of steps up or down, a spring operated brake with electromagnetic release for locking said series of steps when stationary, and regular control switches for said drive motor, a second driving means for driving said endless series of steps at a relatively slow speed comprising; a secondary drive motor adapted to being connected to the said first drive motor to drive said series of steps through said first drive motor; a gear reduction connected between the said secondary drive motor and the said first drive motor for driving said series of steps through said first drive motor at a relatively slow speed; control switches Up, Down and Stop for secondary drive motor, said control switches comprising push buttons mounted in a portable box, Up and Down coils adapted to being energized by the respective Up and Down push buttons and deenergized by the Stop push button, and sets of contacts, normally open, for each coil which closes upon energization of the associated coil, said contacts arranged to cause, when closed, energization of the secondary drive motor to drive the series of steps in the direction indicated by the push button, to cause energization of the brake coil and release of brake, and to bypass the push button allowing it to be released without deenergizing the associated coil; and an interlock switch having a set of contacts connected in series with the control switches of each drive motor said contacts associated with the first drive motor control switches being open and those associated with the second drive motor being closed when said second drive motor is connected to drive the said series of steps through the said first drive motor, and those associated with the first drive motor closed and those associated with the second drive motor open when the first drive motor drives the series of steps and the second motor is disconnected from the first, and both sets of contacts are open when the second drive motor is partially connected to the first and neither drive motor can be energized.

5. In a moving stairway having a first drive motor with a rotating element and a control circuit which when energized causes said motor to drive said stairway at a normal operating speed, a second driving means for driving said stairway at a relatively slow speed for inspection purposes, said second driving means comprising in combination a second drive motor having a second rotating element and second control circuit therefor, said second motor being mounted in sliding relation on a stationary base adjacent to the said drive motor and being movable on said base to engage its rotating element with the rotating element of said first motor, said rotating elements comprising in engagement a gear reduction, and a mechanical interlocking switching means operative in response to movement of said second drive motor on its base and being connected in the control circuits of said drive motors to energize the control circuit of the second drive motor and deenergize the control circuit of the first drive motor when the two rotating elements are in full engagement to drive said stairway at reduced speed by means of the second drive motor through the gear reduction connection to the first drive motor and to deenergize the second control circuit and to energize the first control circuit when the two rotating elements are disengaged to drive said stairway normally by means of the drive motor.

6. In a moving stairway having an endless series of steps, a first drive motor having a gear on its free end for driving said steps at normal operating speed, a spring operated electromagnetically released brake effective when operated to hold said steps stationary and a first control circuit having circuit interrupting contacts for energizing said motor to drive said steps either up or down and to release said brake when said steps are driven up or down, a second driving means for driving said steps at a relatively slow speed for inspection purposes comprising; a base adjacent the first drive motor and having slide members parallel to the axis of said first drive motor; a second drive motor having a smaller gear than said gear on first drive motor on its driving end, mounted on said base slide members and being movable on said base to advance or retract its driving end toward or away from the free end of said drive motor to engage or disengage the gears thereon to drive the steps; a gear reduction comprising when engaged the small gear on the second drive motor and the large gear on the drive motor for reducing the r.p.m. of the first drive motor to the slow inspection operating speed, means for positioning said second motor on its base comprising a manually operated shaft mounted rotatively in the base in engagement with a tapped member attached to the second drive motor and adapted to move said motor on its slide members; a second control circuit having circuit interrupting contacts comprising a portable box having an Up, Down and Stop push buttons mounted therein and adapted to being connected to the rest of the control circuit at a convenient predetermined point, Up and Down electromagnetic coils energized respectively by closing said Up and Down push buttons and deenergized by closing Stop push button, said coils each having sets of contacts respectively in the energizing circuit of the inspection motor for rotating it in either direction of the brake electromagnetic coil for releasing said brake, and in their own circuit for bypassing their own push buttons so said push buttons may be released without breaking said coil circuit; and a mechanical interlock switching means comprising a switch having a roller arm mounted on the base and an actuating cam mounted on the second motor, said roller arm responsive to the movement of the cam moving with the said motor on its base to operate the set of switch contacts respectively in the first control circuit and in the second control circuit, and adapted to open said contacts in said first control circuit and closing said contacts in said second control circuit when the second drive motor is advanced on its base to engage the gears comprising said gear reduction thereby energizing said second control circuit and deenergizing said first control circuit, and closing said contacts in said first control circuit and opening said contacts in said second control circuit when the second motor is retracted in its mount to break the gear reduction thereby energizing said control circiut and deenergizing said second control circuit, and opening both sets of contacts when said gear reduction is partially engaged thereby deenergizing both control circuits.

References Cited in the file of this patent

UNITED STATES PATENTS 1,167,602     Strang ---------------- Jan. 11, 1916